United States Patent
Nagai et al.

(10) Patent No.: US 9,564,790 B2
(45) Date of Patent: Feb. 7, 2017

(54) METHOD FOR MANUFACTURING LAMINATED CORE

(71) Applicant: MITSUI HIGH-TEC, INC., Kitakyushu-shi, Fukuoka (JP)

(72) Inventors: Akira Nagai, Kitakyushu (JP); Jin Oda, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 416 days.

(21) Appl. No.: 14/072,241

(22) Filed: Nov. 5, 2013

(65) Prior Publication Data

US 2014/0124980 A1    May 8, 2014

(30) Foreign Application Priority Data

Nov. 6, 2012 (JP) ................... 2012-244650
Aug. 2, 2013 (JP) ................... 2013-161703

(51) Int. Cl.

| B29C 45/14 | (2006.01) |
|---|---|
| H02K 15/03 | (2006.01) |
| H02K 1/27 | (2006.01) |
| H02K 15/12 | (2006.01) |

(52) U.S. Cl.
CPC .......... *H02K 15/03* (2013.01); *B29C 45/1418* (2013.01); *H02K 1/2766* (2013.01); *H02K 15/12* (2013.01)

(58) Field of Classification Search
None
See application file for complete search history.

(56) References Cited

U.S. PATENT DOCUMENTS

| 4,312,119 A | 1/1982 | Perucchi et al. |
| 4,315,173 A | 2/1982 | Calfo et al. |
| 4,614,022 A | 9/1986 | Bibby et al. |
| (Continued) | | |

FOREIGN PATENT DOCUMENTS

| CN | 101356711 A | 1/2009 |
| CN | 101390273 A | 3/2009 |
| (Continued) | | |

OTHER PUBLICATIONS

Notification of Reasons for Refusal issued by JPO on Japanese Patent Application No. 2013-161703.

(Continued)

*Primary Examiner* — Edmund Lee
(74) *Attorney, Agent, or Firm* — Westerman, Hattori, Daniels & Adrian, LLP

(57) ABSTRACT

A method for manufacturing a laminated core, in which while a laminated core body 10 formed by caulking and with permanent magnets 20 inserted in a plurality of magnet insertion holes 17, 18 is held between a resin injection die 23 and a receiving die 22 opposed to each other, resin is injected into the magnet insertion holes 17, 18 from resin reservoir portions provided to the resin injection die 23 to fix the permanent magnets 20, the method comprising: at a time of resin injection, pressing a flat press surface 24 of the resin injection die 23 against caulking portions 13 protruding from a surface of the laminated core body 10 to apply pressure thereto, thereby allowing the surface of the laminated core body 10 whereon the caulking portions 13 are formed to be pressed against the flat press surface 24 so as to prevent resin leakage.

8 Claims, 9 Drawing Sheets

(56) References Cited

U.S. PATENT DOCUMENTS

| | | | |
|---|---|---|---|
| 5,859,486 | A | 1/1999 | Nakahara et al. |
| 5,893,205 | A | 4/1999 | McClelland |
| 6,167,610 | B1 | 1/2001 | Nakahara et al. |
| 7,653,984 | B2 | 2/2010 | Amano et al. |
| 7,854,056 | B2 | 12/2010 | Watanabe et al. |
| 7,950,133 | B2 | 5/2011 | Amano et al. |
| 8,020,280 | B2 * | 9/2011 | Fukumaru ............ H02K 1/2766 264/272.2 |
| 8,578,592 | B2 | 11/2013 | Nagai et al. |
| 2008/0276446 | A1 | 11/2008 | Amano et al. |
| 2009/0026867 | A1 | 1/2009 | Haruno et al. |
| 2009/0174273 | A1 | 7/2009 | Watanabe et al. |
| 2010/0026127 | A1 | 2/2010 | Mizutani et al. |
| 2010/0083486 | A1 | 4/2010 | Amano et al. |
| 2011/0000079 | A1 | 1/2011 | Fukumaru et al. |
| 2012/0222289 | A1 | 9/2012 | Nagai et al. |
| 2012/0324719 | A1 | 12/2012 | Sasaki et al. |
| 2013/0162063 | A1 * | 6/2013 | Sasajima ................ H02K 1/276 310/43 |
| 2013/0228280 | A1 | 9/2013 | Hirayama et al. |
| 2014/0103574 | A1 | 4/2014 | Ishimatsu |
| 2014/0124980 | A1 | 5/2014 | Nagai et al. |

FOREIGN PATENT DOCUMENTS

| | | | |
|---|---|---|---|
| CN | 101490928 | A | 7/2009 |
| JP | 11-262205 | A | 9/1999 |
| JP | 2002-34187 | A | 1/2002 |
| JP | 2002-247784 | A | 8/2002 |
| JP | 2005-287134 | A | 10/2005 |
| JP | 3786946 | B1 | 6/2006 |
| JP | 2006-197693 | A | 7/2006 |
| JP | 2006-211748 | A | 8/2006 |
| JP | 2006-238584 | A | 9/2006 |
| JP | 2006-345600 | A | 12/2006 |
| JP | 2007-068356 | A | 3/2007 |
| JP | 2007-215301 | A | 8/2007 |
| JP | 2007-318942 | A | 12/2007 |
| JP | 2008-36671 | A | 2/2008 |
| JP | 2008-042967 | A | 2/2008 |
| JP | 2008-54376 | * | 3/2008 |
| JP | 2008-054376 | A | 3/2008 |
| JP | 2008-154436 | A | 7/2008 |
| JP | 2008154436 | * | 7/2008 |
| JP | 2008-263722 | A | 10/2008 |
| JP | 2009-077547 | A | 4/2009 |
| JP | 2009-100634 | A | 5/2009 |
| JP | 2009-195011 | A | 8/2009 |
| JP | 2009-303485 | A | 12/2009 |
| JP | 4414417 | B2 | 2/2010 |
| JP | 2010-158164 | A | 7/2010 |
| JP | 2010-187535 | A | 8/2010 |
| JP | 2010-246266 | A | 10/2010 |
| JP | 2011-55687 | A | 3/2011 |
| JP | 4688505 | B2 | 5/2011 |
| JP | 2012-10572 | A | 1/2012 |
| JP | 4991900 | B2 | 8/2012 |
| WO | 2007/026900 | A1 | 3/2007 |
| WO | 2008/007679 | A1 | 1/2008 |
| WO | 2011/145399 | A1 | 11/2011 |

OTHER PUBLICATIONS

International Search Report for PCT/JP2011/074972, mailing date of Jan. 13, 2012 (2 pages).
Office Action dated Aug. 5, 2014, issued in corresponding Japanese Patent Application No. 2012-171366 (2 pages).
Office Action dated Sep. 30, 2014, issued in corresponding Japanese Patent Application No. 2010-278335 (2 pages).
International Search Report for PCT/JP2011/074842, mailing date of Jan. 31, 2012 (2 pages).
International Search Report of PCT/JP2011/058452, mailing date of Jun. 28, 2011 (2 pages).
Japanese Office Action dated Sep. 30, 2014, issued in corresponding JP Application No. 2010-272769 (3 pages).
Cited in Chinese Office Action dated Oct. 10, 2014, issued in corresponding CN Application No. 201180039235.6 (6 pages).
Notice of Allowance dated Sep. 21, 2015, issued in U.S. Appl. No. 13/885,065 (11 pages).
Notice of Allowance dated Aug. 13, 2013, issued in U.S. Appl. No. 13/509,190. (8 pages).
Non-Final Office Action dated Sep. 11, 2014, issued in U.S. Appl. No. 13/885,065. (13 pages).
Ex Parte Quayle dated Feb. 28, 2013, issued in U.S. Appl. No. 13/509,190. (9 pages).
Non-Final Office Action dated Jun. 16, 2015, issued in U.S. Appl. No. 13/885,050 (21 pages).
Notice of Allowance dated Dec. 16, 2015, issued in U.S. Appl. No. 13/885,065. (9 pages).
Final Office Action dated Dec. 17, 2015, issued in U.S. Appl. No. 13/885,050 (19 pages).
Office Action dated Dec. 21, 2015, issued in corresponding U.S. Appl. No. 14/049,770 (21 pages).
Notification of Reasons for Refusal by SIPO on Chinese patent application No. 201310471440.0; with English translation. (12 pages).
Notification of Reasons for Refusal by SIPO on Chinese patent application No. 201310540651.5; with English translation (18 pages).
Notification of Reasons for Refusal dated Mar. 14, 2014, by SIPO on Chinese patent application No. 201210208937.9. (6 pages).
Notification of Reasons for Refusal issued by JPO on Japanese patent application No. 2011-139741; with English translation. (8 pages).
English translation of Chinese Office Action dated Oct. 10, 2014, issued in corresponding CN Application No. 201180039235.6 submitted on Nov. 2, 2015.
English translation of Japanese Office Action dated Sep. 30, 2014, issued in corresponding JP Application No. 2010-272769 submitted on Nov. 2, 2015.
English translation of Japanese Office Action dated Aug. 5, 2014, issued in corresponding Japanese Patent Application No. 2012-171366 submitted on Nov. 2, 2015.
English translation of Japanese Office Action dated Sep. 30, 2014, issued in corresponding Japanese Patent Application No. 2010-278335 submitted on Nov. 2, 2015.
English translation of Japanese Office Action dated Sep. 17, 2013 issued by JPO on Japanese Patent Application No. 2013-161703 submitted on Nov. 5, 2013.
English translation of Notification of Reasons for Refusal dated Mar. 14, 2014, by SIPO on Chinese patent application No. 201210208937.9, submitted on Jan. 8, 2016. (6 pages).
Final Office Action dated Jun. 30, 2016, issued in U.S. Appl. No. 14/049,770 (11 pages).
Decision of Patent Grant dated Jul. 15, 2016, issued in Japanese Application No. 2012-227126, with English translation (6 pages).
Second Notice of Reasons for Refusal dated Jun. 22, 2016, issued in Chinese Application No. 201310540651.5, with English translation (10 pages).
Second Notice of Reason for Refusal dated May 30, 2016, issued in Chinese Application No. 201310471440.0, with English translation (9 pages).
Notice of Allowance dated May 10, 2016, issued in U.S. Appl. No. 13/885,065 (16 pages).
Non-Final Office Action dated Aug. 26, 2016, issued in U.S. Appl. No. 13/885,050 (36 pages).
Non-Final Office Action dated Dec. 20, 2016, issued in U.S. Appl. No. 14/049,770 (17 pages).

* cited by examiner

PRIOR ART

PRIOR ART

METHOD FOR MANUFACTURING LAMINATED CORE

FIELD OF THE INVENTION

The present invention relates to a method for manufacturing a laminated core such as, e.g., an inner rotor core or an outer rotor core, capable of preventing resin leakage as much as possible when permanent magnets inserted in magnet insertion holes are resin-sealed.

BACKGROUND OF THE INVENTION

Conventionally, a laminated core used in a motor is manufactured by fabricating a laminated core body (core) having a plurality of magnet insertion holes in a circumferential direction thereof by laminating a plurality of core sheets, and after inserting permanent magnets respectively in the magnet insertion holes, placing the laminated core body between a resin injection die and a receiving die to compress the laminated core body in the laminating direction, and filling the magnet insertion holes with resin injected from resin reservoir pots provided to the resin injection die to perform resin sealing. (see Patent Document 1: Japanese Patent No. 4688505)

Moreover, in Patent Document 1, when the resin injection die comes into contact with the laminated core body, caulking protrusions (commonly called as caulking dowels) extending out of the laminated core body are housed in housing portions provided to the resin injection die so as to prevent resin leakage between the resin injection die and the laminated core body.

Furthermore, as illustrated in FIG. 8, in order to prevent resin from remaining on the surface of the laminated core body, a method has been proposed wherein an intermediate plate 66 (also called as a dummy plate, a cull plate or a tray) provided with gate holes 65 for connecting magnet insertion holes 62 with resin reservoir pots 63 is disposed between an upper die 60 serving as a resin injection die and a laminated core body 61 during resin sealing, and after the resin is injected from the gate holes 65 into the magnet insertion holes 62, the intermediate plate 66 is removed together with excess resin from the laminated core body 61. (see Patent Document 2: Japanese Patent No. 4991900)

On this intermediate plate 66, housing portions 68 are formed to house caulking protrusions 67 protruding from the surface of the laminated core body 61. Here, reference numeral 69 shows a lower die (a receiving die).

CITATION LIST

Patent Document

Patent Document 1: Japanese Patent No. 4688505
Patent Document 2: Japanese Patent No. 4991900

SUMMARY OF THE INVENTION

Technical Problem

A thin magnetic steel plate as a material for core sheets used in a laminated core body, however, is manufactured by rolling and, because of the manufacturing method, it is not uniformly flat in height and there remains slight irregular deformation or gradient due to thickness deviation on the surface thereof. Especially in recent years, as reduction in core loss of the magnetic steel plate has been achieved for the purpose of improving motor performance, an appearance of warp on the surface of the magnetic steel plate has become noticeable, which is a phenomenon not observed before. Furthermore, since stress to deform the core surface is applied at the time of blanking at a pressing process for forming core sheets and caulking and laminating the core sheets, finished laminated core bodies have large and small warps.

As a result, especially in a case where each of the core sheets has a large warp, even when the caulking protrusions are housed in the housing portions as described in Patent Document 1, or when the housing portions for housing the caulking protrusions formed on the laminated core body are provided to the intermediate plate by combining the techniques of Patent Documents 1 and 2, it is impossible to eliminate a gap generated between the laminated core body and the surface of the resin injection die or the intermediate plate, or to reduce the gap to the extent that the resin does not leak. This eventually causes resin leakage from the gap during resin sealing and incomplete filling of resin in the magnet insertion holes.

This state is illustrated in FIG. 9 where a black area shows a pressure-sensitive area 70 of pressure-sensitive paper disposed between the laminated core body and the resin injection die, while a white area shows a pressure-insensitive area 71 of the pressure-sensitive paper. In a case where a part of the pressure-insensitive area 71 is in contact with any of the magnet insertion holes 73, resin leakage occurs from the gap. In FIG. 9, R1-R4 show resin leaked areas and leakage directions. Here, reference numerals 72, 74, and 75 show a shaft hole, weight lightening holes, and housing portions for caulking protrusions, respectively.

Moreover, conventionally, when a gap larger than a certain value is visually observed between the laminated core body and the resin injection die or the intermediate plate, the laminated core body is scrapped because resin leakage from the gap is most likely to occur, which has been a cause to lower the yield of the laminated core body.

The inventors of the present invention have found that when the laminated core body is formed using the warped core sheets, it is extremely difficult to uniformly press the laminated core body while avoiding the locations of the caulking portions by adopting the technique disclosed in Patent Document 1 and established, through repeated experiments, a method for manufacturing a laminated core, which prevents resin leakage more securely.

The present invention has been made in view of the above circumstances and the object thereof is to provide a method for manufacturing a laminated core with less resin leakage and less occurrence of incomplete filling of resin in the magnet insertion holes by making the gap generated between the laminated core body and the resin injection die or the intermediate plate to be smaller than a thickness at which resin leakage occurs.

Solution to Problem

According to a first invention for attaining the above object, there is provided a method for manufacturing a laminated core, in which while a laminated core body formed by caulking and laminating a plurality of core sheets and provided at a center thereof with a circular hole around which a plurality of magnet insertion holes in which permanent magnets are inserted are arranged is held between a resin injection die and a receiving die opposed to each other, resin is injected into the magnet insertion holes from resin reservoir portions provided to the resin injection die to fix the permanent magnets, each of the core sheets having a warp with a height difference of 10 µm or less and being provided with a plurality of caulking portions spaced equally or equally in each group in a circumferential direction thereof, the method comprising: making the caulking portions to protrude from a surface of the laminated core body in a range of 10 to 80% of a plate thickness of the core sheet; and at a time of injecting the resin, pressing a flat press surface of the resin injection die against the caulking portions protruding from the surface of the laminated core body to apply pressure thereto, thereby making a gap between the flat press surface and the surface of the laminated core body, whereon the caulking portions are protrudingly formed, to be less than 50 µm so as to prevent resin leakage from the gap.

According to a second invention, there is provided a method for manufacturing a laminated core, in which while a laminated core body formed by caulking and laminating a plurality of core sheets and provided at a center thereof with a circular hole around which a plurality of magnet insertion holes in which permanent magnets are inserted are arranged is held between a resin injection die and a receiving die opposed to each other, resin is injected into the magnet insertion holes from resin reservoir portions provided to the resin injection die to fix the permanent magnets, each of the core sheets having a warp with a height difference of 10 µm or less and being provided with a plurality of caulking portions spaced equally or equally in each group in a circumferential direction thereof, the method comprising: making the caulking portions to protrude from a surface of the laminated core body in a range of 10 to 80% of a plate thickness of the core sheet; placing an intermediate plate between the resin injection die and the laminated core body, the intermediate plate having gate holes for leading the resin from the resin reservoir portions into the magnet insertion holes; and at a time of injecting the resin, pressing a flat press surface of the intermediate plate against the caulking portions to apply pressure thereto, thereby making a gap between the flat press surface and the surface of the laminated core body to be less than 50 µm so as to prevent resin leakage from the gap during injection of the resin.

According to a third invention, there is provided a method for manufacturing a laminated core, in which while a laminated core body formed by caulking and laminating a plurality of core sheets and provided at a center thereof with a circular hole around which a plurality of magnet insertion holes in which permanent magnets are inserted are arranged is held between a resin injection die and a receiving die opposed to each other, resin is injected into the magnet insertion holes from resin reservoir portions provided to the resin injection die to fix the permanent magnets, each of the core sheets being provided with a plurality of caulking portions in a circumferential direction thereof, the method comprising: at a time of injecting the resin, pressing a flat press surface of the resin injection die against the caulking portions protruding from a surface of the laminated core body to apply pressure thereto, thereby allowing the flat press surface to be pressed against the surface of the laminated core body, whereon the caulking portions are formed, so as to prevent resin leakage from a gap between the flat press surface and the surface of the laminated core body.

According to a fourth invention, there is provided a method for manufacturing a laminated core, in which while a laminated core body formed by caulking and laminating a plurality of core sheets and provided at a center thereof with a circular hole around which a plurality of magnet insertion holes in which permanent magnets are inserted are arranged is held between a resin injection die and a receiving die opposed to each other, resin is injected into the magnet insertion holes from resin reservoir portions provided to the resin injection die to fix the permanent magnets, each of the core sheets being provided with a plurality of caulking portions in a circumferential direction thereof, the method comprising: placing an intermediate plate between the resin injection die and the laminated core body, the intermediate plate having gate holes for leading the resin from the resin reservoir portions into the magnet insertion holes, and at a time of injecting the resin, pressing the intermediate plate against the caulking portions protruding from a surface of the laminated core body to apply pressure thereto, thereby allowing the surface of the laminated core body, whereon the caulking portions are formed, to be pressed against a flat press surface of the intermediate plate so as to prevent resin leakage; and after curing the resin, removing the intermediate plate from the laminated core body that has been resin-sealed.

In the method for manufacturing a laminated core according to any of the first to fourth inventions, the laminated core body has been preferably preheated. In this case, the preheating temperature is preferably as low as possible in view of energy, and preferably in a range of, e.g., 50 to 150° C.

In the method for manufacturing a laminated core according to any of the above inventions, the term "warp" is used as a collective term for non-flat states. More specifically, the term refers to a state where, when a single piece of core sheet is placed on a flat board, there is a difference between the minimum height and the maximum height at a surface side of the core sheet. In the present invention, the warp (surface height difference) of each of the core sheets is basically set to be 10 µm or less. Theoretically, when the core sheets having a same-shaped warp are stacked, the warp of the laminated core body also becomes 10 µm or less. However, since the shapes of warps of the core sheets to be laminated vary, when a multiplicity of the core sheets are laminated, the surface height difference of the laminated core body becomes much larger than 10 µm.

Here, when the housing portions for housing the protruding caulking portions are provided either on the resin injection die or on the intermediate plate, it has been confirmed through experiments that an extremely large load is required to make the warp formed on the surface of the laminated core body to be smaller than a specified value (e.g., less than 50 µm) by directly pressing the warped core sheets.

On the other hand, when the resin injection die or the surface of the intermediate plate is made flat, the laminated core body is pressed through the protruding caulking portions. In this case, the pressing force is transmitted to the periphery through the caulking portions, and thereby the warp (i.e., irregularities) on the surface of the laminated core body can be made small, e.g. less than 50 µm, with a relatively small load.

The reason for setting the warp of the each core sheet to be 10 µm or less is that, when the warp of the each core sheet exceeds 10 µm, a total warp of the laminated core body becomes large, thus requiring the pressing force of the resin injection die or of the intermediate plate to be larger than the generally employed pressure, which is unfavorable in view of operation. The standards for warp can be changed according to the capacity of a die device used.

Advantageous Effects of Invention

In the method for manufacturing a laminated core according to any of the first to fourth inventions, since the caulking portions protruding from the laminated core body are pressed by the flat press surface of the resin injection die or of the intermediate plate, even if the respective core sheets are slightly warped, the warp on the surface of the laminated core body is corrected by the load transmitted through the caulking portions, thereby the gap between the flat press surface of the resin injection die or of the intermediate plate and the surface of the laminated core body becomes less than 50 μm and the resin leakage at the time of resin sealing can be eliminated.

DETAILED DESCRIPTION OF THE INVENTION

Preferred embodiments of the present invention will now be described hereunder with reference to the accompanying drawings for the present invention to be understood.

For explaining a method for manufacturing a laminated core according to a first embodiment of the present invention, first, an ordinary laminated core body 10 to which resin sealing is to be performed will be described while referring to FIGS. 1 and 2. The laminated core body 10 is formed by blanking out a plurality of core sheets 11 and 12 in shapes as illustrated in FIG. 2 from an elongated magnetic steel plate having a thickness of e.g. 0.15 to 0.5 mm by a press die, and caulking and laminating the core sheets 11 and 12.

Figure 2:
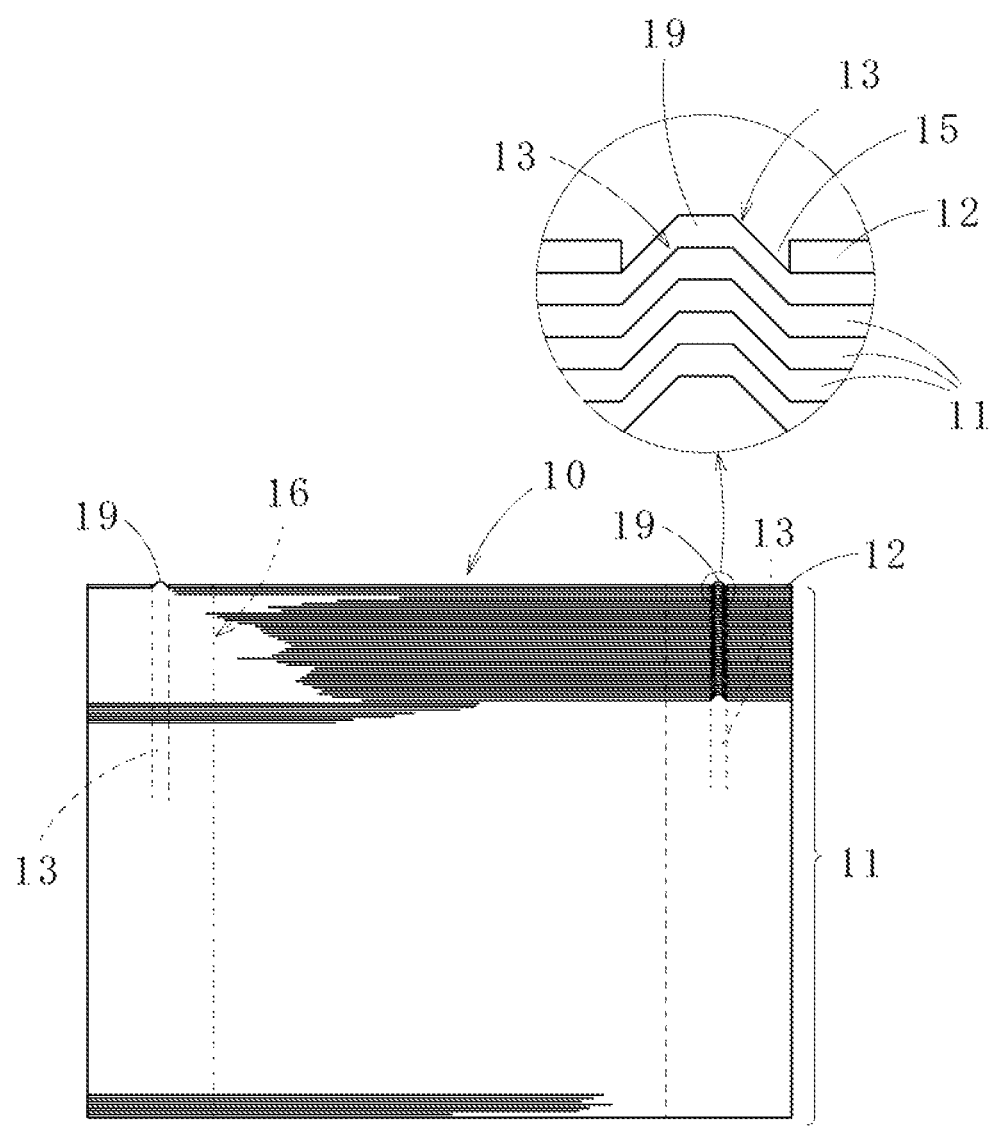
FIG. 2 is a front view of the laminated core body of the laminated rotor core.

As shown in FIG. 2, excluding the uppermost core sheet 12, each of the core sheets 11 is provided with caulking portions 13 spaced at equal angles in a circumferential direction thereof. The uppermost core sheet 12 is provided with caulking through-holes 15 corresponding to the caulking portions 13 formed in the underlying core sheets 11. In this embodiment, V-shaped caulking is employed at the caulking portions 13, and each of the caulking through-holes 15 is configured by a punched hole in a rectangular shape as viewed from above. Each of the caulking portions in a rectangular shape as viewed from above has longer sides thereof directed to the circumferential direction. Here, the "circumferential direction" refers to the circumferential direction of the circular core sheet or of the laminated core body as viewed from above, which is the same hereinafter.

The laminated core body 10 formed by caulking and laminating these core sheets 11 and 12 is provided at a center thereof with a shaft hole 16, which is an example of a circular hole, around which a plurality of pairs (eight pairs in this embodiment) of magnet insertion holes 17 and 18 are arranged at equal angles. The caulking portions 13 respectively have a thickness larger than that of each of the core sheets 11 and 12 (e.g., a thickness of 1.1 times or 1.2 to 1.8 times the thickness of the core sheet) and protrude from an upper surface of the uppermost core sheet 12, thereby forming caulking protrusions 19 which form top portions of the caulking portions 13.

Figure 1:
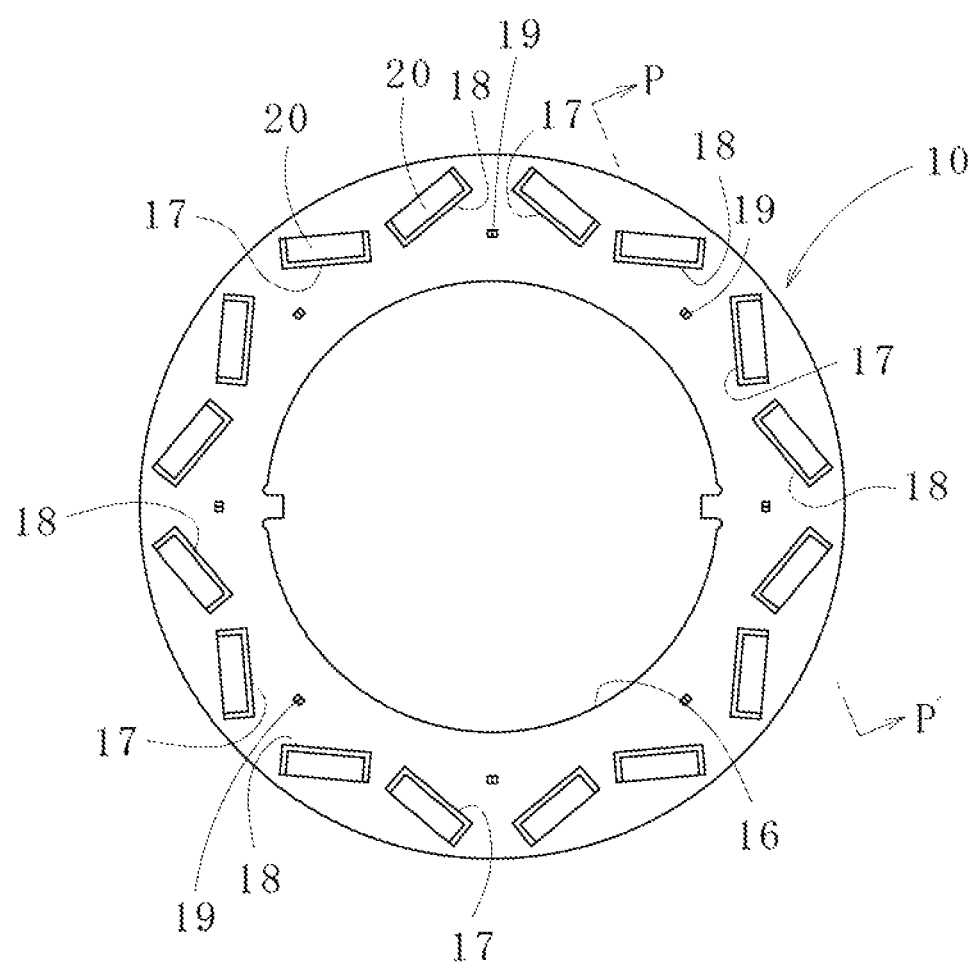
FIG. 1 is a plan view of a laminated core body of a laminated rotor core to which a method for manufacturing a laminated core according to a first embodiment of the present invention is applied.
Figure 6:
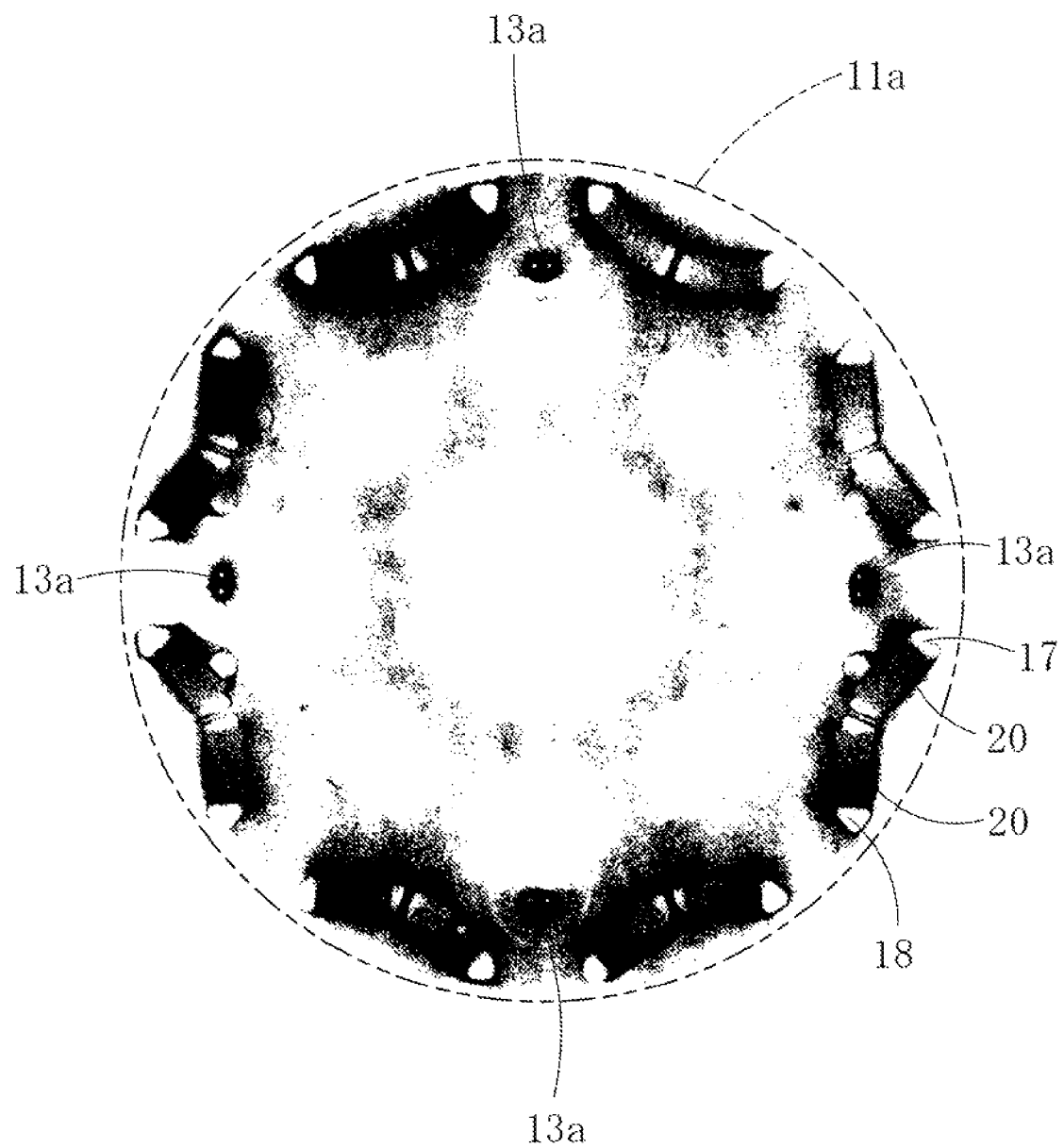
FIG. 6 is an explanatory drawing showing a compression state of a surface of a laminated core body observed using pressure-sensitive paper (here, the laminated core body is different from the one shown in FIG. 9)

As illustrated in FIG. 1, the caulking protrusions 19 are located at intermediate positions between each adjacent pair of the magnet insertion holes 17 and 18, at a same radial distance, and at equal angular intervals in the circumferential direction. Accordingly, the plurality of caulking protrusions 19 are formed axisymmetrically on an uppermost portion of the laminated core body 10. Alternatively, as illustrated in FIG. 6, caulking portions 13a may be formed between every other pair of the magnet insertion holes 17 and 18 such that four caulking portions 13a are provided at 90-degree positions in the circumferential direction. The caulking portions 13 and 13a are respectively provided at the same radial positions on the core sheets 11 and 12.

Figure 3:
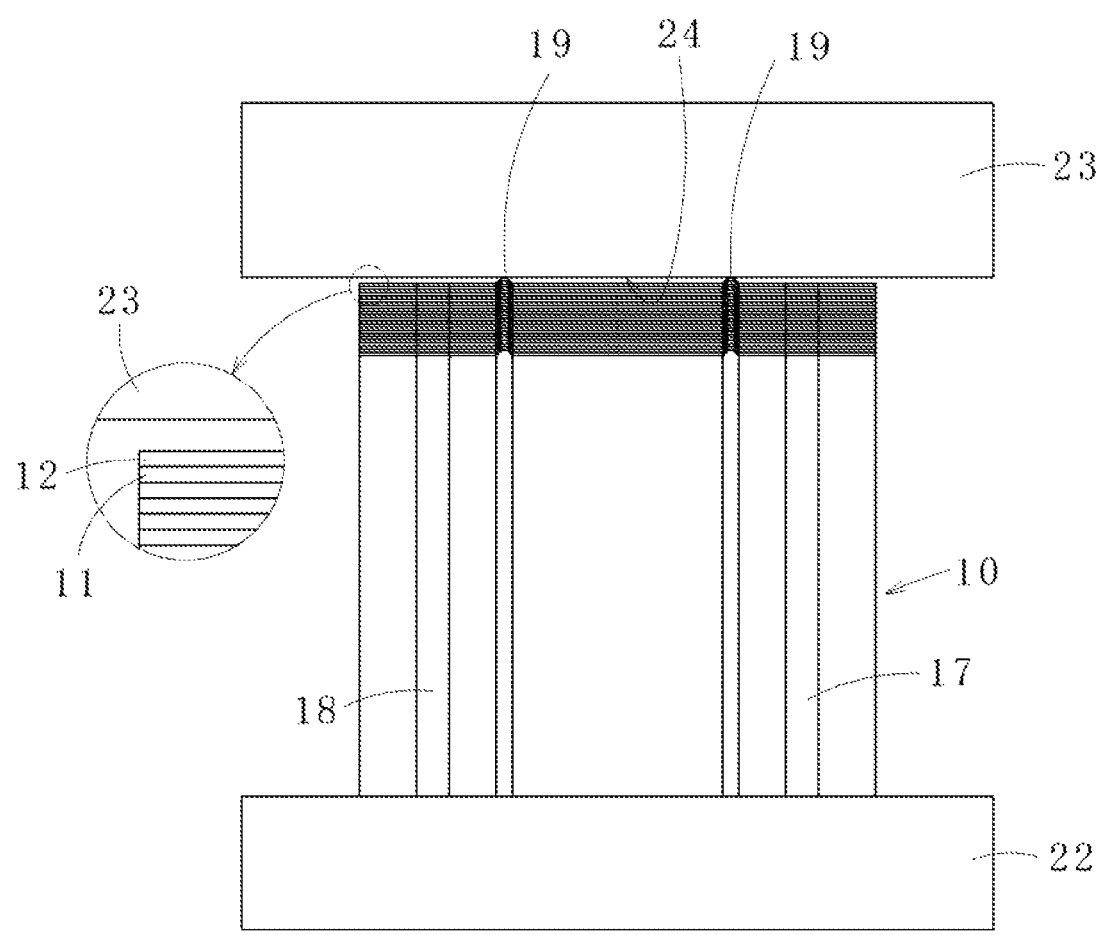
FIG. 3 is a cross-sectional view taken along arrows P-P' in FIG. 1.

Accordingly, as partially illustrated in FIGS. 1 and 3, when the laminated core body 10 configured as described above is subjected to resin sealing, permanent magnets 20 (including non-magnetized magnets) are inserted in the magnet insertion holes 17 and 18, respectively. Subsequently, the laminated core body 10 is, where necessary, placed on a carrier tray not illustrated (see Japanese Unexamined Patent Application Publication No. 2008-199890) and disposed between a resin injection die 23 provided with resin reservoir portions and a receiving die 22. Then, the receiving die 22 is elevated to clamp and compress the laminated core body 10. A flat press surface 24 of the resin injection die 23 is perfectly flat, and e.g., not provided with recessed portions for housing the caulking protrusions 19. That is, when resin is injected from the resin reservoir portions into the magnet insertion holes 17 and 18, the flat press surface 24 is pressed against the caulking protrusions 19 to apply pressure thereto.

Figure 4A:
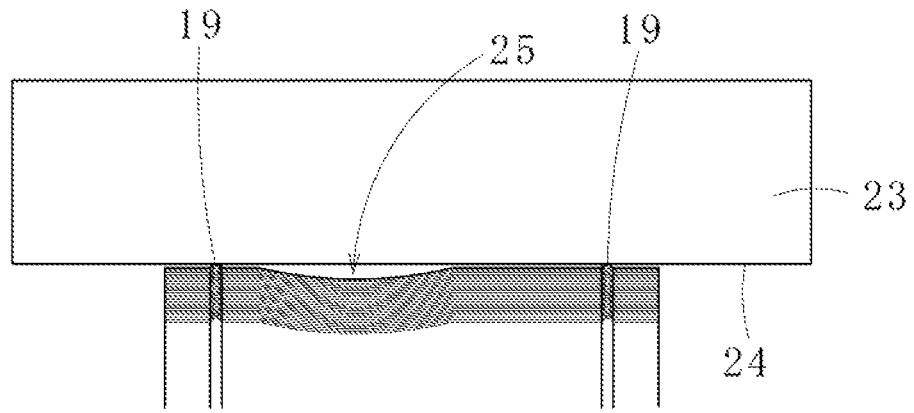
FIGS. 4(A), 4(B) and 4(C), respectively, are explanatory drawings illustrating states where a laminated core body is clamped and pressed between a resin injection die and a receiving die.
Figure 4B:
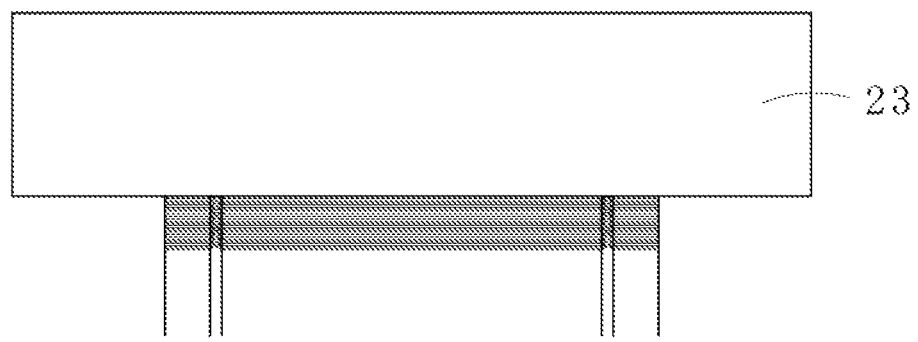

FIGS. 4(A) and 4(B) show a correction state of a warp 25 of the laminated core body 10 pressed between the resin injection die 23 and the receiving die 22 opposed to each other. In a case where, as illustrated in FIG. 4(A), the warp 25 recessed downward exists on the laminated core body 10, when the receiving die 22 is elevated, the flat press surface 24 comes into contact with the caulking protrusions 19 formed on the upper portion of the laminated core body 10, and presses the caulking protrusions 19. The caulking protrusions 19 respectively communicate to the caulking portions 13 formed in each of the core sheets 11. Moreover, the caulking portions 13 are formed at positions at equal angles apart in the circumferential direction of the each core sheet 11, and the load is not directly applied to the warp 25 formed between the respective caulking portions 13. Consequently, height differences between the respective caulking portions 13 are reduced, thereby planarization (i.e., to make the height of respective caulking portions at the same level) can be achieved. This allows a surface whereon the caulking portions 13 (caulking protrusions 19) are formed to be brought into close contact with the flat press surface 24 so as to prevent resin leakage. The close contact referred to herein includes not only a state where the caulking protrusions 19 and the flat press surface 24 are completely in contact with each other but also a state where a gap that will not cause resin leakage (e.g., a gap of less than 50 μm) exists between the upper surface of the laminated core body 10 and the flat press surface 24.

Figure 4C:
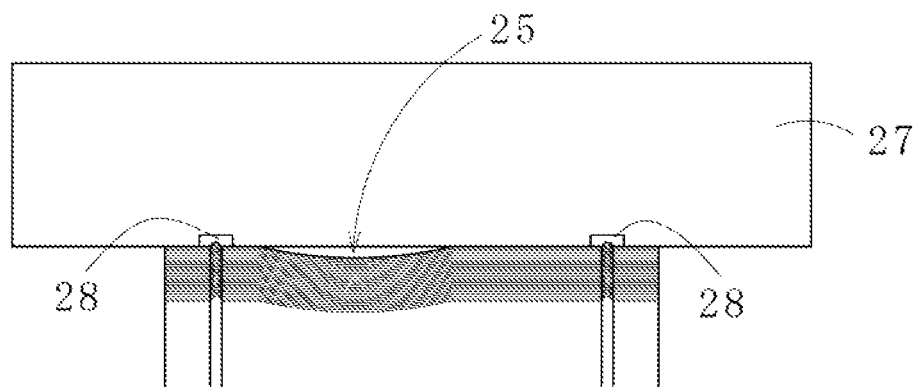

FIG. 4(C) shows a case where recessed portions 28 in which the caulking protrusions 19 are housed respectively are provided to a resin injection die 27; only a load is applied around the warped area and the height difference in the surface of the laminated core body 10 still remains. Making the core sheets 11 and 12 to be in a flat state requires an extremely large load because the surface area of the laminated core body 10 is also large. It also requires the area of the laminated core body 10 to be large and the application of a load that exceeds the strength of a member (e.g., pillars) for supporting the resin injection die 27 and the receiving die 22, which, however, is impossible. Meanwhile in the present embodiment, since a load is applied uniformly to the laminated core body 10 through the caulking portions 13, the load is applied more uniformly to the respective core sheets 11 and 12 through the caulking portions 13. As a result, the warp 25 can be corrected more effectively and the gap generated on the surface at the resin injection side of the laminated core body 10 can be reduced (which is the same in the following embodiments).

Figure 5A:
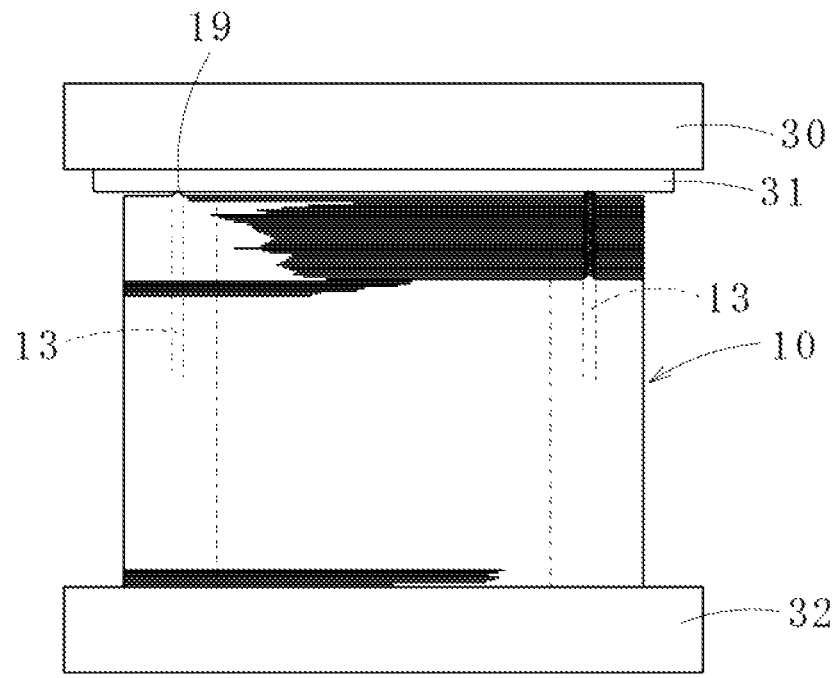
FIGS. 5(A) and 5(B), respectively, are explanatory drawings of the methods for manufacturing a laminated core according to second and third embodiments of the present invention.

FIG. 5(A) shows a method for manufacturing a laminated core according to a second embodiment of the present invention. In a case where the resin is injected with a cull plate 31, which is an example of an intermediate plate (also called as a dummy plate), placed between a resin injection die 30 and the laminated core body 10, a flat press surface of the cull plate 31 with which the caulking protrusions 19 come into contact is made perfectly flat. Because of such a structure, when the laminated core body 10 is held and pressed between the resin injection die 30 and a receiving die 32, a load is concentrated on the caulking portions 13, thereby removing the warp more effectively and reducing a gap between the cull plate 31 and the laminated core body 10 (i.e., the cull plate 31 and the laminated core body 10 are closely attached with a gap of, e.g., less than 50 μm). On the cull plate 31, gate holes (resin injection holes) for injecting the resin into the magnet insertion holes 17 and 18, and where necessary, groove-like runners connecting the gate holes with resin reservoir pots (an example of resin reservoir portions) formed in the resin injection die 30 are provided. After the resin is cured, the cull plate 31 is removed from the laminated core body 10 that has been resin-sealed.

Figure 5B:
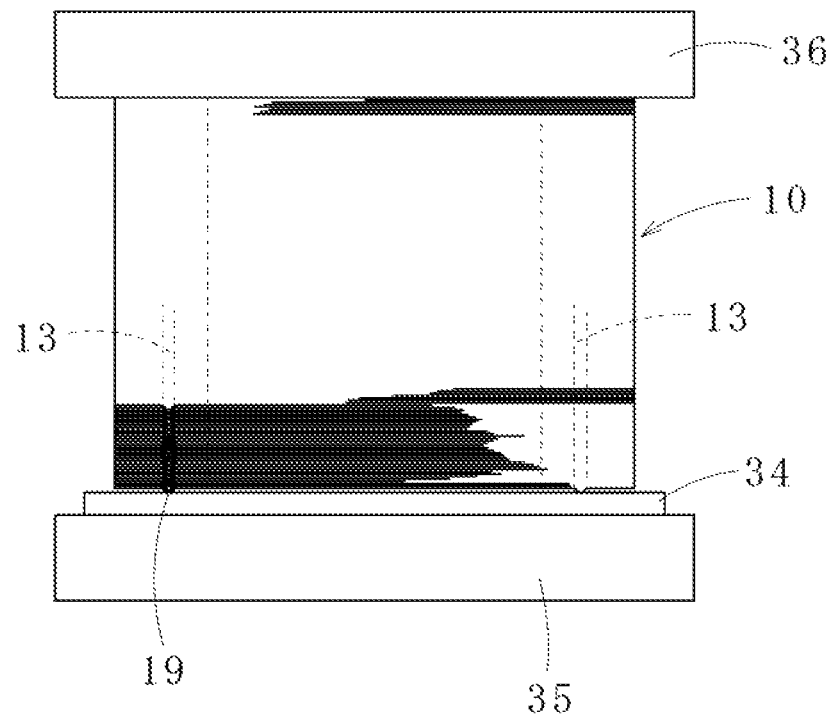

FIG. 5(B) illustrates a method for manufacturing a laminated core according to a third embodiment of the present invention. In a case where the laminated core body 10 has the caulking protrusions 19 protruding downward and a carrier tray 34 is disposed beneath the laminated core body 10, an area of the carrier tray 34 that contacts the caulking protrusions 19 is made flat. A resin injection die 35 having resin reservoir pots (an example of resin reservoir portions) for injecting the resin in this embodiment serves as a lower die, while a receiving die 36 serves as an upper die. Alternatively, the resin injection die may be disposed as the upper die and the receiving die may be disposed as the lower die (which is the same in the above embodiments). In this example, the gate holes for injecting the resin into the magnet insertion holes 17 and 18 are provided on the carrier tray 34. In the method for manufacturing a laminated core according to each of the above embodiments, the warps of some of the core sheets were measured and it is presumed that the warps (distortions, more precisely, surface height differences) of the respective core sheets 11 and 12 were in a range of 3 to 10 μm).

FIG. 6 shows a state where a laminated core body 11a with pressure-sensitive paper placed thereon is pressed by a resin injection die through an intermediate plate having a flat contact surface. The laminated core body 11a has the four caulking portions 13a spaced equally in the circumferential direction. The other side of the laminated core body 11a is supported by a receiving die. The pressure-sensitive paper turned black where a load was applied, and it is clear that the load was applied to areas around the magnet insertion holes and the caulking portions 13a. In this experimental example, resin leakage did not occur.

Figure 7:
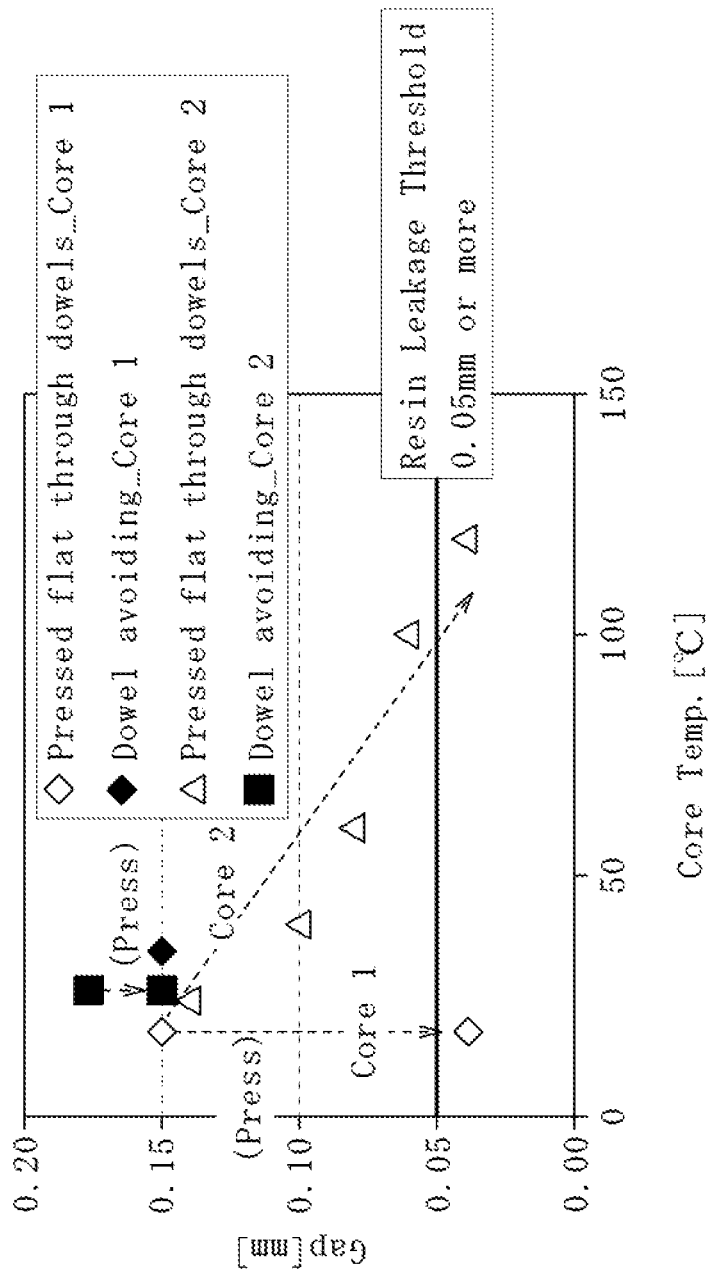
FIG. 7 is a graph showing occurrence states of resin leakage when permanent magnets are resin-sealed in laminated core bodies under various conditions.
Figure 8:
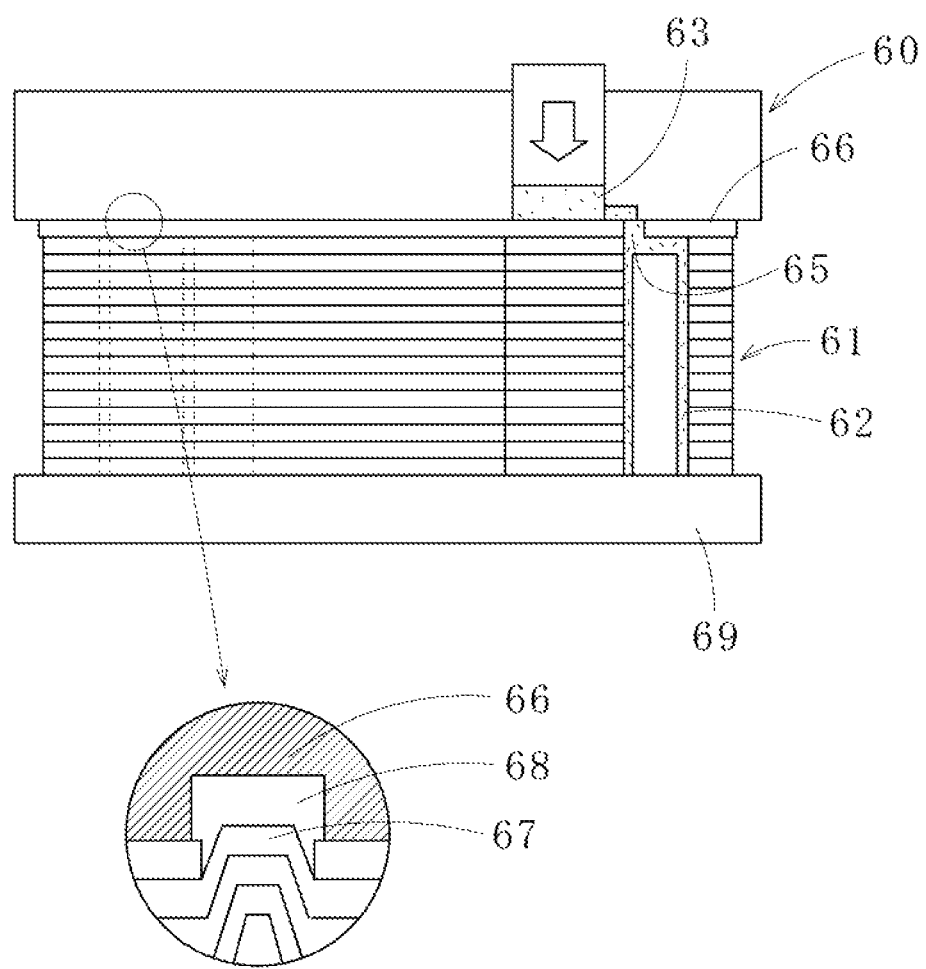
FIG. 8 is an explanatory drawing illustrating a method for manufacturing a laminated core according to a conventional example.
Figure 9:
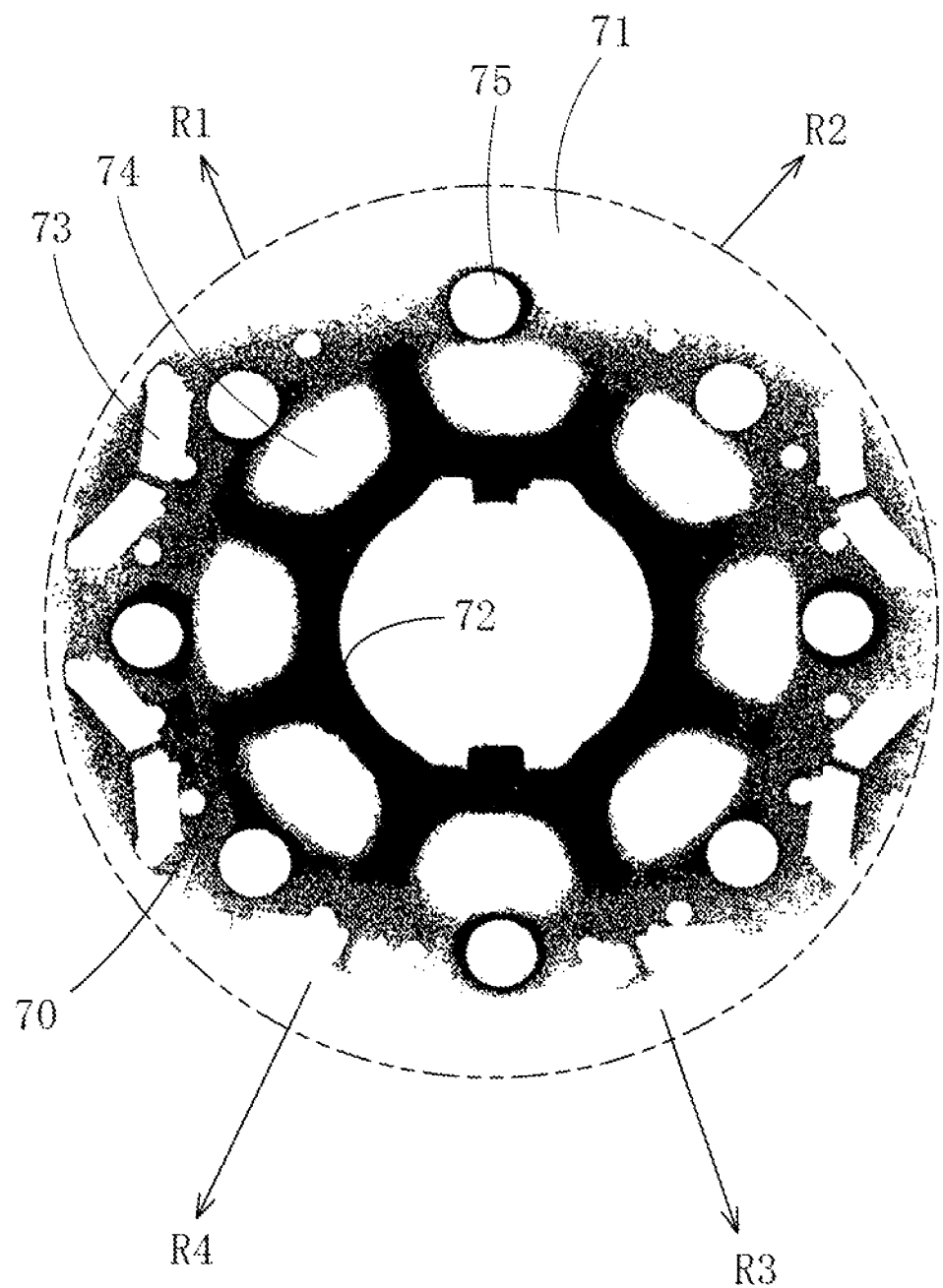
FIG. 9 is an explanatory drawing illustrating a compression state of a surface of a laminated core body in a method for manufacturing a laminated core according to a conventional example observed using pressure-sensitive paper.

FIG. 7 is a graph showing the results of investigating resin leakage in cases where caulking protrusions (dowels) were pressed flat (i.e., pressed by a flat surface) and where recessed portions (dowel avoiding) for housing the caulking protrusions were formed. A resin leakage threshold is set to 0.05 mm because of filler mixed in the resin. In other words, this means that when there is a gap of 0.05 mm or more on the surface of the laminated core body 10, resin leakage occurs, while when the gap is less than 0.05 mm, resin leakage does not occur.

When the dowel avoiding was employed, gaps in both cases of Core (laminated core body) 1 and Core 2 pressed by a resin injection die and a receiving die could not be made less than 0.15 mm, and resin leakage from the gaps occurred since the gaps exceeded the resin leakage threshold. Moreover, when the dowel avoiding was employed, even when Core 1 and Core 2 were heated, there was no change in the gaps of these cores.

Meanwhile, when Core 1 was pressed flat through the dowels by the resin injection die and the receiving die, the gap became less than 0.05 mm. Moreover, when Core 2 was pressed flat, the gap exceeded the resin leakage threshold; however, at the time when the core was heated to 100° C. or to above 100° C., the gap became less than 0.05 mm and resin leakage did not occur since the gap was below the threshold. The laminated core body 10 is usually injected with a thermosetting resin, and thus, is preheated. Therefore, even if a gap of about 0.15 mm exists, resin leakage can be prevented by applying a surface load to the caulking protrusions. Here, the warps of core sheets used in FIG. 7 were in a range of 3 to 10 μm in a non-heated state and it has been confirmed that the warp on the surface of the each laminated core body in a non-heated and non-pressed state was about 100 to 160 μm.

Therefore, based on the above, it was found that when the caulking protrusions are pressed by the resin injection die having the flat press surface, the load is transmitted through the caulking portions, thus reducing the gap between the surface of the laminated core body and the resin injection die, and thereby causing no resin leakage. Moreover, heating the laminated core body further reduces deformation due to warp, thus the gap is nearly eliminated and resin leakage does not occur.

The present invention is not limited to the above-described embodiments, and the configuration thereof can be changed without departing from the gist of the present invention.

For example, for the caulking portions, half-blanking caulking may be employed instead of the V-shaped caulking.

Moreover, in the above embodiments, examples are shown in which the present invention is applied to the manufacture of laminated rotor cores (rotor cores). However, the present invention may be applied to the manufacture of laminated stator cores (stator cores).

Furthermore, the plurality of caulking portions are preferably provided axisymmetrically in pairs at the same radial positions on the core sheet, and further, spaced equally by one caulking portion or by each group in the circumferential direction, which, however, is not requisite to the present invention.

In the above embodiments, the caulking portions are spaced at equal angles and equal radial positions in the circumferential direction of the each core sheet. However, the present invention may also be applied to a case where the caulking portions are spaced equally in each group having the plurality of calking portions in the circumferential direction.

In the above embodiments, an inner diameter of the shaft hole of the laminated core body is, e.g., approximately, 30 to 100 mm, and an outer diameter of the laminated core body is, e.g., approximately, 110 to 200 mm. The height of the laminated core body is, approximately, 100 mm.

DESCRIPTION OF NUMERALS

10: laminated core body, 11,12: core sheet, 11a: laminated core body, 13,13a: caulking portion, 15: caulking through-hole, 16: shaft hole, 17,18: magnet insertion hole, 19: caulking protrusion, 20: permanent magnet, 22: receiving die, 23: resin injection die, 24: flat press surface, 25: warp, 27: resin injection die, 28: recessed portion, 30: resin injection die, 31: cull plate, 32: receiving die, 34: carrier tray, 35: resin injection die, 36: receiving die

What is claimed is:

1. A method for manufacturing a laminated core, comprising:
   holding a laminated core body between a resin injection die and a receiving die opposed to each other, the laminated core body being formed by caulking and laminating a plurality of core sheets and being provided at a center thereof with a circular hole around which a plurality of magnet insertion holes in which permanent magnets are inserted are arranged,
   while holding the laminated core body, injecting resin into the magnet insertion holes from resin reservoir portions provided to the resin injection die to fix the permanent magnets, each of the core sheets having a warp with a height difference of 10 μm or less and being provided with a plurality of caulking portions spaced equally or equally in each group in a circumferential direction thereof, the caulking portions protruding from a surface of the laminated core body in a range of 10 to 80% of a plate thickness of each of the core sheets, and
   at a time of injecting the resin, pressing a flat press surface of the resin injection die against the caulking portions protruding from the surface of the laminated core body to apply pressure thereto, thereby making a gap between the flat press surface and the surface of the laminated core body, whereon the caulking portions are protrudingly formed, to be less than 50 μm so as to prevent resin leakage from the gap.

2. A method for manufacturing a laminated core, comprising:
   holding a laminated core body between a resin injection die and a receiving die opposed to each other, the laminated core body being formed by caulking and laminating a plurality of core sheets and being provided at a center thereof with a circular hole around which a plurality of magnet insertion holes in which permanent magnets are inserted are arranged,
   placing an intermediate plate between the resin injection die and the laminated core body, the intermediate plate having gate holes for leading resin from resin reservoir portions into the magnet insertion holes,
   while holding the laminated core body, injecting the resin into the magnet insertion holes from the resin reservoir portions provided to the resin injection die to fix the permanent magnets, each of the core sheets having a warp with a height difference of 10 μm or less and being provided with a plurality of caulking portions spaced equally or equally in each group in a circumferential direction thereof, the caulking portions protruding from a surface of the laminated core body in a range of 10 to 80% of a plate thickness of each of the core sheets, and
   at a time of injecting the resin, pressing a flat press surface of the intermediate plate against the caulking portions to apply pressure thereto, thereby making a gap between the flat press surface and the surface of the laminated core body to be less than 50 μm so as to prevent resin leakage from the gap during injection of the resin.

3. A method for manufacturing a laminated core, comprising:
   holding a laminated core body between a resin injection die and a receiving die opposed to each other, the laminated core body being formed by caulking and laminating a plurality of core sheets and being provided at a center thereof with a circular hole around which a plurality of magnet insertion holes in which permanent magnets are inserted are arranged,
   injecting resin into the magnet insertion holes from resin reservoir portions provided to the resin injection die to fix the permanent magnets, each of the core sheets being provided with a plurality of caulking portions in a circumferential direction thereof, and
   at a time of injecting the resin, pressing a flat press surface of the resin injection die against the caulking portions protruding from a surface of the laminated core body to apply pressure thereto, thereby allowing the flat press surface to be pressed against the surface of the laminated core body, whereon the caulking portions are formed, so as to prevent resin leakage from a gap between the flat press surface and the surface of the laminated core body, the gap between the flat press surface and the surface of the laminated core body being smaller than 50 μm.

4. A method for manufacturing a laminated core, comprising:
   holding a laminated core body between a resin injection die and a receiving die opposed to each other, the laminated core body being formed by caulking and laminating a plurality of core sheets and being provided at a center thereof with a circular hole around which the plurality of magnet insertion holes in which permanent magnets are inserted are arranged,
   placing an intermediate plate between the resin injection die and the laminated core body, the intermediate plate having gate holes for leading resin from resin reservoir portions into a plurality of magnet insertion holes in the laminated core body,
   injecting the resin into the magnet insertion holes from the resin reservoir portions provided to the resin injection die to fix the permanent magnets, each of the core sheets being provided with a plurality of caulking portions in a circumferential direction thereof, at a time of injecting the resin, pressing the intermediate plate against the caulking portions protruding from a surface of the laminated core body to apply pressure thereto, thereby allowing the surface of the laminated core body, whereon the caulking portions are formed, to be pressed against a flat press surface of the intermediate plate so as to prevent resin leakage, a gap between the flat press surface of the intermediate plate and the surface of the laminated core body being smaller than 50 μm, and after curing the resin, removing the intermediate plate from the laminated core body that has been resin-sealed.

5. The method for manufacturing a laminated core as defined in claim 1, wherein the laminated core body has been preheated.

6. The method for manufacturing a laminated core as defined in claim 2, wherein the laminated core body has been preheated.

7. The method for manufacturing a laminated core as defined in claim 3, wherein the laminated core body has been preheated.

8. The method for manufacturing a laminated core as defined in claim 4, wherein the laminated core body has been preheated.

* * * * *